(12) United States Patent
Wakabayashi et al.

(10) Patent No.: US 6,730,780 B2
(45) Date of Patent: May 4, 2004

(54) WATER-BASED INK

(75) Inventors: Shigemi Wakabayashi, Wakayama (JP); Takehiro Tsutsumi, Wakayama (JP); Kenji Kaida, Tochigi (JP); Makoto Sakakibara, Wakayama (JP)

(73) Assignee: Kao Corporation, Toyko (JP)

( * ) Notice: Subject to any disclaimer, the term of this patent is extended or adjusted under 35 U.S.C. 154(b) by 0 days.

(21) Appl. No.: 09/959,284

(22) PCT Filed: Feb. 21, 2001

(86) PCT No.: PCT/JP01/01248
§ 371 (c)(1),
(2), (4) Date: Oct. 19, 2001

(87) PCT Pub. No.: WO01/60933
PCT Pub. Date: Aug. 23, 2001

(65) Prior Publication Data
US 2003/0019392 A1 Jan. 30, 2003

(30) Foreign Application Priority Data
Feb. 21, 2000 (JP) ........................................ 2000-042477
Jul. 3, 2000 (JP) ........................................ 2000-201253

(51) Int. Cl.$^7$ ........................... C09B 43/32; C09D 11/00
(52) U.S. Cl. ........................ 534/591; 534/592; 534/651; 534/793; 534/797; 534/817; 549/394; 106/31.43; 106/31.45; 106/31.5
(58) Field of Search ..................... 534/591, 592, 534/651, 793, 797, 817; 549/394; 106/31.43, 31.48, 31.5

(56) References Cited

U.S. PATENT DOCUMENTS

| | | | |
|---|---|---|---|
| 2,759,921 A | * | 8/1956 | Schmid et al. ............... 534/593 |
| 3,338,880 A | | 8/1967 | Favre et al. |
| 3,509,122 A | | 4/1970 | Horstmann et al. |
| 3,622,558 A | * | 11/1971 | Kolliker et al. ............. 534/751 |
| 3,627,750 A | | 12/1971 | Ronco et al. |
| 3,642,768 A | | 2/1972 | Ribka et al. |
| 3,684,792 A | | 8/1972 | Mueller |
| 4,234,486 A | | 11/1980 | Brinkley ..................... 540/133 |
| 4,965,345 A | | 10/1990 | Loeffler |
| 5,760,215 A | | 6/1998 | Gisler et al. |
| 5,780,621 A | | 7/1998 | Harms et al. |
| 5,851,621 A | | 12/1998 | Wolleb et al. |
| 5,856,472 A | | 1/1999 | Herd et al. |

FOREIGN PATENT DOCUMENTS

| | | |
|---|---|---|
| CH | 367583 | 2/1963 |
| CH | 519007 | 2/1972 |
| DE | 1247510 | 8/1967 |
| GB | 1247435 | 9/1971 |
| GB | 1328258 | 8/1973 |
| JP | 50-113534 A | 9/1975 |
| JP | 53-4083 B | 1/1978 |
| JP | 63301279 | 8/1988 |
| JP | 9-25427 | 1/1997 |
| JP | 9-53019 | 2/1997 |
| JP | 9-157562 | 6/1997 |
| JP | 09188662 * | 7/1997 |
| JP | 9-241553 | 9/1997 |
| JP | 9-241558 | 9/1997 |
| JP | 9-255882 | 9/1997 |
| JP | 10-97732 | 4/1998 |
| JP | 10-088047 | 4/1998 |
| JP | 10-273604 | 10/1998 |

OTHER PUBLICATIONS

Machiguhi et al., Chemical Abstracts, 127:191919, 1997.*

* cited by examiner

Primary Examiner—Fiona T. Powers
(74) Attorney, Agent, or Firm—Birch, Stewart, Kolasch & Birch, LLP

(57) ABSTRACT

An oil-soluble dye prepared by subjecting a water-soluble dye having at least one group selected from the group consisting of sulfonate group and carboxyl group in its molecule to amidation: a water-based ink comprising the oil-soluble dye: and a process for preparing an oil-soluble dye, comprising halogenating a water-soluble dye having at least one group selected from the group consisting of sulfonate group and carboxyl group in its molecule, and thereafter subjecting the resulting halogenated water-soluble dye to amidation. The Oil-soluble dye of the present invention can be suitably and favorably used for inks for inkjet recording, inks for ball-points pens, inks for markers, toners, paints such as lacquers, inks for felt pens, and the like.

9 Claims, No Drawings

WATER-BASED INK

This application is the national phase under 35 U.S.C. §371 of PCT International Application No. PCT/JP01/01248 which has an International filing date of Feb. 21, 2001, which designated the United States of America and was published in English.

TECHNICAL FIELD

The present invention relates to an oil-soluble dye which can be suitably used for inks for inkjet recording, inks for ball-point pens, inks for markers, toners, paints such as lacquers, inks for felt pens, and the like. The oil-soluble dye as referred to in the present specification means a non-water-soluble dye in general.

The present invention also relates to a water-based ink, and more particularly to a water-based ink which can be suitably used for a water-based ink for inkjet recording and the like.

BACKGROUND ART

Oil-soluble dyes have been used for various applications mentioned above by dissolving the oil-soluble dye in an organic solvent and the like; dispersing the oil-soluble dye in water; or containing the oil-soluble dye in a polymer and thereafter dispersing the polymer in water.

Various oil-soluble dyes hitherto have been developed. However, there has not yet been developed an oil-soluble dye which has vivid color tone, which is excellent in light fastness and weathering resistance, which has acid resistance and alkali resistance, and which is capable of sufficiently dissolving in an organic solvent.

For instance, as oil-soluble magenta dyes, there have been known monoazoic dyes such as C.I. Solvent Red 1, 3; disazoic dyes such as C.I. Solvent Red 18, 24, 27; metal complex dyes such as C.I. Solvent Red 8, 132; anthraquinone dyes such as C.I. Solvent Red 52, 111, 145, 146, 149, 150, 151, 155; xantene dyes such as C.I. Solvent Red 49, 218; amino ketone dyes such as C.I. Solvent Red 109, 179, 180; perinone dyes such as C.I. Solvent Red 135, 176; and the like. Among them, monoazoic dyes, disazoic dyes, metal complex dyes, anthraquinone dyes, amino ketone dyes and oil-soluble perinone dyes have some defects such that they have low solubility in an organic solvent having a low polarity, such as toluene, and dull color tones. Also, the oil-soluble xantene dye has poor light fastness.

As yellow dyes, azoic dyes such as C.I. Solvent Yellow 14, 16, 29, 33, 44, 56, 77, 79, 82, 93, 114, 116, 117 have been marketed, but all of those have some defects such that they have low solubility in an organic solvent having a low polarity, and poor handling ability. As cyanine dyes, metal phthalocyanine dyes, triphenylmethane dyes and anthraquinone dyes such as C.I. Solvent Blue 14, 25, 35, 38, 70, 83, 94, 105 have been known, but those cyanine dyes have the same defects as those of the yellow dyes.

In addition, a disperse dye having water resistance, acid resistance and alkali resistance generally has low solubility in an organic solvent.

On the other hand, water-soluble dyes such as acid dyes include ones having vivid color tone and being excellent in fastness. When this dye is neutralized with, for instance, a basic compound having high hydrophobicity such as octylamine, the neutralized dye would possess solubility in an organic solvent with maintaining characteristics as a dye. However, the neutralized dye is poor in acid resistance and alkali resistance.

A carbon black-dispersed ink has been partly used as a black ink employed in a water-based ink for personal or office printers, and the like, excluding the industrial uses. Water-soluble dyes are used for most of the black inks. Also, the water-soluble dyes have been the mainstream of color inks.

However, the water-based ink in which a water-based dye has been used has a defect that its water resistance is drastically lowered.

In order to improve water resistance, inks made of a pigment dispersion have been developed. However, the inks, particularly color inks are insufficient for dispersibility, and color tone for high color reproduction quality, optical density and reliability.

An object of the present invention is to provide an oil-soluble dye which is excellent in water rest alkali resistance, acid resistance, light fastness and solvent solubility.

Another object of the present invention is to provide a water-based ink which has vivid color tone, which imparts excellent water resistance, light fastness and weathering resistance to printed characters, ad which is excellent in storage stability.

A further object of the present invention is to provide a water-based ink for inkjet recording, which would not cause clogging on the printer heads.

These objects and other objects of the present invention will be apparent from the following description.

DISCLOSURE OF INVENTION

According to the present invention, there are provided:

(1) an oil-soluble dye prepared by subjecting a water-soluble dye having at least one group selected from the group consisting of sulfonate group and carboxyl group in its molecule to amidation;

(2) a water-based ink comprising an oil-soluble dye prepared by subjecting a water-soluble dye having at least one group selected from the group consisting of sulfonate group and carboxyl group in its molecule to amidation; and (3) a process for preparing an oil-soluble dye, comprising halogenating a water-soluble dye having at least one group selected from the group consisting of sulfonate group and carboxyl group in its molecule, and thereafter subjecting the resulting halogenated water-soluble dye to amidation.

BEST MODE FOR CARRYING OUT THE INVENTION

The water-soluble dye having at least one group selected from the group consisting of sulfonate group and carboxyl group in its molecule includes acid dyes, reactive dyes, direct dyes and food dyes, having at least one group selected from the group consisting of sulfonate group and carboxyl group in its molecule.

The acid dye includes, for instance,

C.I. Acid Yellow 1, 2, 5, 7, 16, 17, 23, 24, 26, 28, 29, 31, 41, 44, 48, 50, 51, 52, 52:1, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, preferably C.I. Acid Yellow 5, 17, 23;

C.I. Acid Black 1, 3, 4, 7, 11, 12, 13, 14, 17, 18, 19, 23, 25, 29, 34, 36, 38, 39, 40, 41, 42, 44, 49, 50, 53, 55, 59, 61, 64, 70, 71, 72, 75, 76, 78, 79, 98, 99, 110, 111, 112, 114, 116, 118, 119, 122, 127, 128, 131, 135, 141, 142, 143, 151, 159, 161, 162, 163, 164, 165, 169, 172, 174, 190, 195, 196, 197, 199, 218, 219, 222, 227;

C.I. Acid Orange 7, 8, 10, 19, 20, 24, 28, 33, 41, 45, 51, 56, 64;

C.I. Acid Red 1, 4, 6, 8, 9, 13, 14, 15, 18, 19, 21, 26, 27, 30, 32, 34, 35, 37, 40, 42, 44, 51, 52, 54, 57, 62, 75, 77, 80, 82, 83, 85, 87, 88, 89, 92, 94, 97, 106, 108, 110, 111, 114, 115, 117, 118, 119, 127, 128, 129, 130, 131, 133, 134, 135, 138, 143, 144, 145, 151, 152, 154, 155, 158, 168, 172, 176, 180, 183, 184, 186, 187, 194, 198, 199, 209, 211, 215, 216, 217, 219, 249, 252, 254, 256, 257, 261, 262, 263, 265, 266, 274, 276, 282, 283, 289, 299, 301, 305, 317, 318, 320, 321, 322, 336, 337, 361, 396, 397, preferably C.I. Acid Red 35, 37, 40, 52, 87, 92, 265, 289;

C.I. Acid Violet 5, 7, 11, 15, 34, 35, 41, 43, 47, 48, 49, 51, 75, 90, 103, 126;

C.I. Acid Blue 1, 7, 9, 15, 22, 23, 25, 27, 29, 40, 41, 43, 45, 51, 53, 54, 55, 56, 59, 60, 62, 72, 74, 76, 78, 80, 81, 82, 83, 90, 92, 93, 100, 102, 103, 104, 106, 111, 112, 113, 117, 120, 124, 126, 127, 129, 130, 131, 138, 140, 142, 143, 145, 151, 154, 158, 161, 166, 167, 168, 170, 171, 175, 181, 182, 183, 184, 187, 192, 199, 203, 204, 205, 207, 220, 221, 229, 230, 232, 234, 236, 247, 249, 258, 260, 264, 271, 277, 278, 279, 280, 288, 290, 326, preferably C.I. Acid Blue 9;

C.I. Acid Green 3, 9, 12, 16, 19, 20, 25, 27, 41, 44;

C.I. Acid Brown 4, 14, and the like.

The reactive dye includes, for instance,

C.I. Reactive Black 1, 3, 4, 5, 6, 8, 12, 14, 21, 23, 26, 31, 32, 34, 37, preferably C.I. Reactive Black 37;

C.I. Reactive Yellow 1, 2, 3, 12, 13, 14, 15, 17, 18, 23, 24, 25, 26, 27, 29, 35, 37, 41, 42;

C.I. Reactive Orange 2, 5, 7, 16, 20, 24;

C.I. Reactive Red 3, 6, 7, 11, 12, 13, 15, 17, 19, 21, 22, 23, 24, 29, 35, 36, 37, 40, 41, 42, 43, 45, 49, 55, 63, 66, 84, 120, 180, 184, preferably C.I. Reactive Red 23, 24, 120, 180;

C.I. Reactive Violet 1, 2, 3, 4, 5, 6, 7, 8, 9, 16, 17, 22, 23, 24, 26, 27, 33, 34;

C.I. Reactive Blue 2, 3, 5, 7, 8, 10, 12, 13, 14, 15, 17, 18, 19, 20, 21, 25, 26, 27, 28, 29, 37, 38, 40, 41;

C.I. Reactive Green 5, 7;

C.I. Reactive Brown 1, 7, 16, and the like.

The direct dye inch includes, for instance,

C.I. Direct Black 2, 4, 9, 11, 14, 17, 19, 22, 27, 32, 36, 38, 41, 48, 51, 56, 62, 69, 71, 74, 75, 77, 78, 80, 91, 94, 97, 105, 106, 107, 108, 112, 113, 114, 117, 118, 121, 122, 125, 132, 133, 146, 154, 166, 168, 171, 173, 194, 199;

C.I. Direct Yellow 1, 2, 4, 8, 9, 11, 12, 24, 26, 27, 28, 29, 33, 34, 35, 39, 41, 42, 44, 48, 50, 51, 53, 58, 59, 68, 72, 85, 86, 87, 88, 89, 93, 95, 96, 98, 100, 106, 108, 109, 110, 127, 130, 132, 135, 141, 142, 144, 161, 163, preferably C.I. Direct Yellow 86, 132;

C.I. Direct Orange 6, 8, 10, 26, 29, 39, 41, 49, 51, 62, 102;

C.I. Direct Red 1, 2, 4, 8, 9, 11, 13, 15, 17, 20, 23, 24, 26, 28, 31, 33, 37, 39, 44, 46, 47, 48, 51, 59, 62, 63, 72, 73, 75, 76, 77, 79, 80, 81, 83, 84, 85, 87, 89, 90, 92, 94, 95, 99, 101, 108, 110, 111, 113, 145, 173, 184, 189, 197, 201, 207, 211, 212, 214, 218, 220, 221, 223, 224, 225, 226, 227, 228, 229, 230, 232, 233, 240, 241, 242, 243, 247, 250, 256, 257, 321;

C.I. Direct Violet 1, 7, 9, 12, 35, 47, 48, 51, 66, 90, 93, 94, 95, 98, 100, 101;

C.I. Direct Blue 1, 2, 6, 8, 10, 12, 15, 22, 25, 34, 41, 55, 67, 68, 69, 70, 71, 72, 75, 76, 77, 78, 80, 81, 82, 83, 84, 86, 87, 90, 98, 106, 108, 109, 110, 120, 123, 151, 156, 158, 159, 160, 163, 165, 168, 189, 192, 193, 194, 195, 196, 199, 200, 201, 202, 203, 207, 211, 213, 214, 218, 225, 226, 229, 236, 237, 239, 244, 246, 248, 249, 251, 252, 258, 264, 270, 280, 287, 288, 289, 291, preferably C.I. Direct Blue 86, 199;

C.I. Direct Green 1, 6, 8, 28, 33, 37, 63, 64;

C.I. Direct Brown 1A, 2, 6, 25, 27, 44, 58, 95, 100, 101, 106, 112, 173, 194, 195, 209, 210, 211, and the like.

The food dye includes, for instance,

C.I. Food Black 1, 2; C.I. Food Yellow 3, 4, 5; C.I. Food Red 2, 3, 7, 9, 14, 52, 87, 92, 94, 102, 104, 105, 106; C.I. Food Violet 2; C.I. Food Blue 1, 2; C.I. Food Green 2, 3, and the like.

Among them, C.I. Acid Red 289, C.I. Acid Yellow 23, C.I. Acid Yellow 17, C.I. Direct Yellow. 86 and C.I. Direct Yellow 132 are preferable, from the viewpoints of having excellent color reproduction quality, having vivid color tone, and being excellent in light fastness and weathering resistance.

The oil-soluble dye of the present invention can be prepared by subjecting sulfonate group and/or carboxyl group of the water-soluble dye to amidation. It is preferable that halogenation is carried out before the amidation. Among the halogenation, chlorination is more preferable.

The halogenation of the water-soluble dye can be carried out in an organic solvent. The organic solvent is not limited to specified ones, as long as the organic solvent can dissolve the water-soluble dye. The organic solvent includes halogen-containing solvents such as chloroform, methylene chloride and dichloroethane; aprotic solvents such as thionyl chloride, toluene, methyl ethyl ketone, 1,3-dimethyl-2-imidazohidinone and 2-pyrrolidone; and the like. Among them, 1,3-dimethyl-2-imidazoldinone and chloroform can be suitably used from the viewpoint of dye solubility, inertness to a halogenating agent, and costs. The amount of the organic solvent is not limited to specified ones, and it is preferable that the amount is usually 500 to 100000 parts by weight or so, based on 100 part by weight of the water-soluble dye.

When the water-soluble dye is halogenated, it is preferable to use a catalyst. The catalyst includes a dialkylformamide represented by the formula:

wherein each of $R^1$ and $R^2$ is independently an alkyl group having 1 to 5 carbon atoms; and the like. Among $R^1$ and $R^2$, methyl group and ethyl group are preferable, and methyl group is especially preferable. Among the catalyst, N,N-dimethylformamide can be suitably used.

It is desired at the amount of the catalyst is 0.001 to 100 mol, preferably 0.1 to 50 mol, more preferably 1 to 5 mol, per one mol of the water-soluble dye, from the viewpoints of reaction rate, yield, costs and the like and from the viewpoint of yield when isolation and purification are carried out by washing with water.

The halogenation of the water-soluble dye can be readily carried out by previously dissolving a water-soluble dye and a catalyst in an organic solvent, and adding a halogenating agent to the resulting water-soluble dye solution.

When the water-soluble dye is halogenated, it is preferable that the internal of the reaction system is previously replaced with an inert gas to provide an inert gas atmosphere. The inert gas includes nitrogen gas, argon gas, and the like. Among them, nitrogen gas is preferable.

It is desired that the temperature of the water-soluble dye solution is 0° to 80° C., preferably 0° to 6° C., more preferably 10° to 40° C. when the halogenating agent is added to the water-soluble dye solution, from the viewpoints of stability of reaction, safety and suppression of side reactions, and from the viewpoints of reaction rate, yield and costs, and the like.

The halogenating agent includes, for instance, thionyl chloride, chlorine gas, hydrochloric acid, phosphorus pentachloride, phosphonyl chloride, sulfonyl chloride, phosgene, and the like. Among them, thionyl chloride is preferable, from the viewpoints of reaction yield, safety and costs. It is preferable that the amount of the halogenating agent is an amount capable of sufficiently halogenating sulfonate group and/or carboxyl group existing in the water-soluble dye. It is preferable at the amount of the halogenating agent is usually 1 to 100 mol, per one mol of he total amount of the sulfonate group and the carboxyl group existing in the water-soluble dye.

After the addition of the halogenating agent, it is desired that the reaction mixture is aged at a temperature of 15° to 85° C., preferably 15° C. to 35° C. for 1 to 24 hours or so, in order to sufficiently progress the halogenation reaction. Also, the above-mentioned catalyst can be added to the reaction mixture as occasion demands, and the mixture can be further aged. After the halogenation reaction is sufficiently progressed, halogenating agent such as thionyl chloride is removed from the mixture by washing with water, and amidation can be carried out. The amidation can also be immediately carried out after the halogenation, without washing with water.

Next, the amidation of the halogenated water-soluble dye can be carried out by subsequently adding an amidation agent to the resulting reaction solution. It is preferable to use as the amidation agent a primary amine, a secondary amine, or a basic dye having an amino group in its molecule, from the viewpoints of solubility of the reaction product in a solvent, absorbance of the reaction product, and the like.

The amine includes a primary amine represented by the formula:

$NH_2R^3$ wherein $R^3$ is an alkyl group having 8 to 24 carbon atoms, especially preferably 12 to 24 carbon atoms, an aryl group having 6 to 24 carbon atoms, a trialkylsilyl group having 3 to 14 carbon atoms, or a fluoroalkyl group having an alkyl group of 1 to 12 carbon atoms; and the like. It is preferable that the number of carbon atoms of the primary amine is not less than 6, from the viewpoint of non-water solubility. In addition, it is preferable to use the basic dye having an amino group in its molecule as an amidation agent, such as C.I. Basic Red 9, C.I. Basic Blue 5 or the like, from the viewpoint of the improvement of color development of the dye.

The secondary amine includes a secondary amine represented by the formula:

$HNR^4R^5$ wherein each of $R^4$ and $R^5$ is independently an alkyl group having 2 to 12 carbon atom preferably 4 to 10 carbon atoms, an aryl group having 6 to 10 carbon atoms, a trialkylsilyl group having 3 to 10 carbon atoms, a fluoroalkyl group having an alkyl group of 1 to 12 carbon atoms, or $R^4$ may form a heterocyclic ring together with $R^5$; and the like. The alkyl group having 2 to 12 carbon atoms, preferably 4 to 10 carbon atoms includes butyl group, pentyl group, hexyl group, n-octyl group, 2-ethylhexyl group, and the like. Among them, hexyl grow, n-octyl group and 2-ethylhexyl group are preferable. It is desirable that the number of carbon atoms is not more than 12, preferably not more than 10, because the absorbance is appropriate. Among the aryl groups having 6 to 10 carbon atoms, phenyl group, benzyl group, and the like are preferable. As the trialkylsilyl group having 3 to 10 carbon atoms, trimethylsilyl group is preferable. As the fluoroalkyl group, fluoromethyl group is preferable. In addition, when $R^4$ forms a heterocyclic ring together with $R^5$, it is preferable that the heterocyclic ring is 5-membered or 6-membered ring.

Among the amidation agents, a hexaalkyldisilazane represented by the formula:

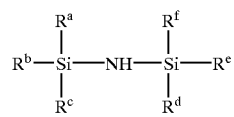

wherein each of $R^a$, $R^b$, $R^c$, $R^d$, $R^e$ and $R^f$ is independently an alkyl group having 1 to 6 carbon atoms, represented by hexamethyldisilazane, dibutylamine, dioctylamine, dihexylamine and di-2-ethylhexylamine are preferable, from the viewpoints of solubility of the reaction product in a solvent, absorbance of the reaction product, and the like. Especially, di-2-ethylhexylamine is preferable. The secondary amine is preferable, because the non-water solubility of the reaction product sometimes becomes insufficient when the primary amine has too low a molecular weight, and alkali resistance and absorbance of the reaction product sometimes become insufficient when the primary amine has too high a molecular weight.

It is desired that the amount of the amidation agent is 1.2 to 20 mol, preferably 1.2 to 10 mol, per one mol of the total amount of the sulfonate group and the carboxyl group, from the viewpoints of reaction rate and yield and the viewpoint of yield during washing with water.

When the amidation agent is added, it is desired that the liquid temperature of the above-mentioned reaction solution is 0° to 60° C., preferably 10° to 20° C., from the viewpoints of reaction rate and yield and in consideration of the boiling points of the amidation agent and the solvent.

In addition, it is preferable that the atmosphere during the amidation is an inert gas atmosphere which is similar to that described above, from the viewpoint of stability of the reaction intermediate (halogenated product).

After the addition of the amidation agent the reaction mixture can be aged at a temperature of 20° to 80° C., preferably 20° to 60° C. for 1 to 24 hours or so in order to sufficiently progress the amidation.

The oil-soluble dye is thus obtained. The oil-soluble dye can be collected by washing the resulting reaction solution containing the oil-soluble dye with water, an aqueous alkali or the like allowing the oil-soluble dye to precipitate in hexane or the like, and filtering the precipitated oil-soluble dye. The oil-soluble dye can be dried or further washed, as occasion demands.

Among the oil-soluble dyes, it is preferable to use an oil-soluble dye having at least one group selected from the group consist of a group represented by $-SO_2NR^4R^5$, wherein $R^4$ and $R^5$ are as defined above, and a group represented by $-CONR^4R^5$ wherein $R^4$ and $R^5$ are as defined above.

In the water-soluble dye having at least one group selected firm the group consisting of sulfonate group and carboxyl group in its molecule, which can be suitably used in the present invention, each of C.I. Acid Red 289, C.I. Acid Yellow 23, C.I. Acid Yellow 17 and C.I. Direct Yellow 132 corresponds to an oil-soluble dye represented by the formula (1):

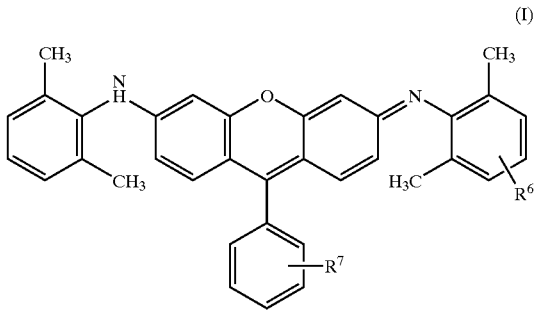

wherein each of $R^6$ and $R^7$ is independently —$SO_2NR^4R^5$, wherein $R^4$ and $R^5$ are as defined above; an oil-soluble dye represented by the formula (II):

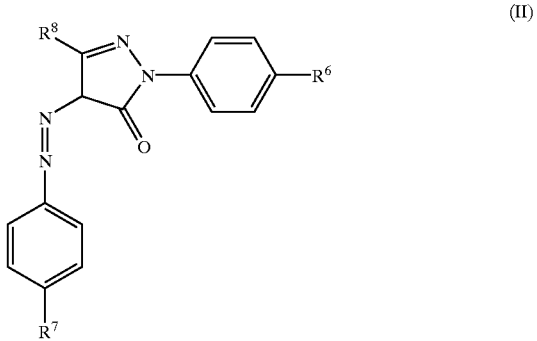

wherein $R^6$ and $R^7$ are as defined above; and $R^8$ is —$CONR^4R^5$ wherein and $R^5$ are as defined above; an oil-soluble dye represented by the formula (III):

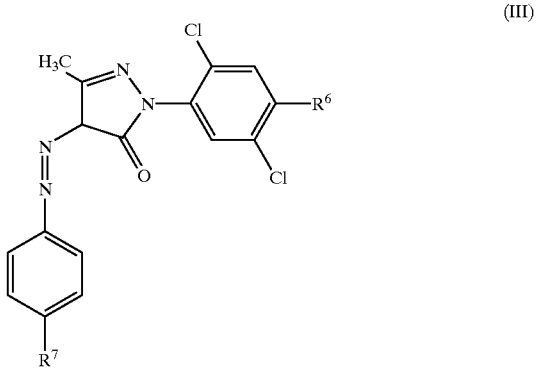

wherein $R^6$ and $R^7$ are as defined above; and an oil-soluble dye represented by the formula (IV):

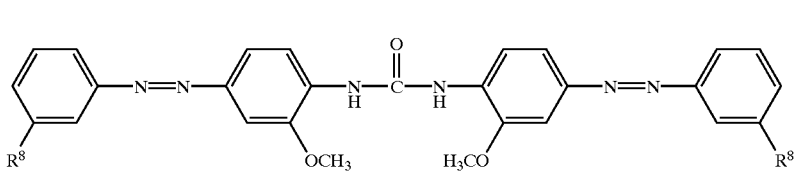

wherein $R^8$ is —$SO_2NR^4R^5$, wherein $R^4$ and $R^5$ are as defined above, respectively. The oil-soluble dyes represented by the formulas (I) to (IV) can be those which are not prepared from a water-soluble dye.

Since the oil-soluble dye of the present invention is excellent in all of water resistance, alkali resistance, acid resistance, light fastness and solvent solubility as mentioned above, the oil-soluble dye can be suitably used for inks for inkjet recording, inks for ball-point pens, inks for markers, toners, paints such as lacquers, inks for felt pens, and the like.

The emulsion comprising an oil-soluble dye implies both of the following:

(I) a dispersion comprising an emulsion in which only an oil-soluble dye is dispersed; and (II) a dispersion comprising an emulsion in which polymer particles containing an oil-soluble dye are dispersed.

Among those embodiments, the latter embodiment (II) is preferable from the viewpoints of dispersion stability and jetting stability.

The dispersion comprising an emulsion in which only an oil-soluble dye is dispersed is an aqueous dispersion in which an oil-soluble dye is dispersed in water by a dispersant or a surfactant, or an aqueous dispersion of an oil-soluble dye, to which a self-dispersibility treatment is conducted.

The polymer component used in the polymer emulsion comprising the oil-soluble dye includes polyester polymers, vinyl polymers, polyurethane polymers, polyamide polymers, and the like. Among them, the vinyl polymers are preferable. The vinyl polymer is preferably a polymer obtained by copolymerizing a monomer composition comprising:

(a) at least one vinyl monomer selected from the group consisting of acrylic acid esters, methacrylic acid esters and styrenic monomers, (b) a polymerizable unsaturated monomer having a salt-forming group, and (c) a monomer copolymerizable with the vinyl monomer and the polymerizable unsaturated monomer having a salt-forming group.

The vinyl monomer includes acrylates such as methyl acrylate, ethyl acrylate isopropyl acrylate, n-butyl acrylate, t-butyl acrylate, isobutyl acrylate, n-amyl acrylate, n-hexyl acrylate, n-octyl acrylate and dodecyl acrylate; methacrylates such as methyl methacrylate, isopropyl methacrylate, n-butyl methacrylate, t-butyl methacrylate, isobutyl methacrylate, n-amyl methacrylate, 2-ethylhexyl methacrylate, lauryl methylate and polyethylene glycol methacrylate; and styrenic monomers such as styrene, vinyltoluene and 2-methylstyrene.

The polymerizable unsaturated monomer having a salt-forming group includes cationic monomers having a salt-forming group and anionic monomers having a salt-forming group.

The cationic monomer having a salt-forming group includes unsaturated tertiary amine-containing monomers, unsaturated ammonium salt-containing monomers, and the like. Among them, preferable examples include N,N-diethylaminoethyl acrylate, N-(N',N'-dimethylaminoethyl) acrylamide, vinylpyridine, 2-methyl-5-vinylpyridine, dimethylaminoethyl methacrylate, dimethylaminoethyl methacrylate, and the like.

The anionic monomer having a salt-forming group includes unsaturated carboxylic acid monomers, unsaturated sulfonic acid monomers, unsaturated phosphoric acid monomers, and the like. Among them, preferable examples include acrylic acid, methacrylic acid, itaconic acid, maleic acid, fumaric acid, and the like.

The monomer copolymerizable with the vinyl monomer and the polymerizable unsaturated monomer having a salt-forming group includes acrylamide monomers; methacrylamide monomers; silicone macromers having a polymerizable functional group at one end; methacrylate macromers having a polymerizable functional group at one end; styrenic macromers having a polymerizable functional group at one end; polyester macromers having a polymerizable functional group at one end; polyurethane macromers having a polymerizable functional group at one end; polyalkyl ether macromers having a polymerizable functional group at one end; hydroxyl group-containing monomers; a monomer represented by the formula (V):

$$CH_2=C(R^7)COO(R^8O)_pR^9 \qquad (V)$$

wherein $R^7$ is hydrogen atom or a lower alkyl group having 1 to 4 carbon atoms; $R^8$ is a divalent hydrocarbon group having 1 to 30 carbon atoms which may have a hetero-atom; $R^9$ is a monovalent hydrocarbon group having 1 to 30 carbon atoms which may have a hetero-atom; and p is a number of 1 to 60; and the like. Those monomers can be used alone or in admixture of at least two kinds. Those monomers are given by way of exemplification, without intending to limit the present invention to those exemplified ones.

The hydroxyl group-containing monomer includes 2-hydroxyethyl acrylate, 3-hydroxypropyl acrylate, polyethylene glycol(n=2–30) acrylate, 2-hydroxyethyl methacrylate, 3-hydroxypropyl methacrylate, polyethylene glycol(n=2–30) methacrylate, poly(ethylene glycol(n=1–15).propylene glycol(n=1–15)) acrylate, poly(ethylene glycol(n=1–15).propylene glycol(n=1–15)) methacrylate, and the like. Among them, 2-hydroxyethyl acrylate and 2-hydroxyethyl methacrylate are preferable.

The monomer represented by the formula (V) exhibits excellent effects such that the jetting stability of the water-based ink of the present invention is increased, and that generation of crookedness is suppressed even when subjected to continuous printing.

Concrete examples of the monomer represented by the formula (V) include methoxypoloyethylene glycol (1–30), showing the value of p in the formula (V), hereinafter referred to the same) (meth)acrylates, methoxypolytetramethylene glycol (1–30) (meth)acrylates, ethoxypolyethylene glycol (1–30) (meth)acrylates,(iso)propoxypolyethylene glycol (1–30) (meth)acrylates, butoxypolyethylene glycol (1–30) (meth)acrylates, methoxypolypropylene glycol (1–30) (meth)acrylates, methoxy(ethylene glycol-propylene glycol copolymer) (1–30, out of which ethylene glycol: 1–29) (meth)acrylates, and the like. Those monomers can be used alone or in admixture of at least two kinds. Among them, methoxypolyethylene glycol (1–30) (meth)acrylates are preferable. The term "(meth)acrylic" as referred to in the present specification is intended to mean methacrylic or acrylic. Also, the term "(iso)propoxy" is intended to mean n-propoxy or isopropoxy.

Among those copolymerizable monomers, the silicone macromer, methacrylic acid ester macromer and the styrenic macromer are preferable.

It is desired that the content of the vinyl monomer in the monomer composition is 1 to 40% by weight, preferably 2 to 20% by weight, from the viewpoints of improvement in dispersion stability of the polymer emulsion and avoidance of scorching on the inkjet printer head.

It is desired that the content of the polymerizable unsaturated monomer having a salt-forming group in the monomer composition is 2 to 40% by weight, preferably 5 to 20% by weight, from the viewpoints of improvement in dispersion stability of the polymer emulsion and avoidance of scorching on the inkjet printer head.

It is desired that the content of the vinyl monomer and the monomer copolymerizable with the polymerizable unsaturated monomer having a salt-forming group in the monomer composition is 60 to 90% by weight, preferably 70 to 85% by weight, from the viewpoints of improvement in dispersion stability of the polymer emulsion and avoidance of scorching on the inkjet printer head.

The monomer composition may further comprise a polymerization chain transfer agent as occasion demands.

The polymer can be obtained by copolymerizing the monomer composition by a known polymerization method such as a bulk polymerization method, a solution polymerization method, a suspension polymerization method or an emulsion polymerization on method. Among those methods, the solution polymerization method is especially preferable.

The solvent used in the solution polymerization method includes aliphatic alcohols such as ethanol and propanol; ketones such as acetone and methyl ethyl ketone; esters such as ethyl acetate; aromatic solvents such as benzene and toluene; and the like. Those solvents can be used alone or in admixture of at least two kinds.

It is preferable that the weight-average molecular weight of the polymer is 3000 to 100000, preferably 3000 to 50000, as determined in accordance with gel permeation chromatography described in Examples. 6 to 10 and Comparative Examples 16 to 22 given below, from the viewpoint of avoidance of scorching on a printer head, and from the viewpoints of durability of print and stability of the dispersion.

In order to contain the oil-soluble dye in the polymer particles included in the emulsion, a known emulsification method such as a forced emulsification method, a phase-inversion emulsification method, a dispersion polymerization method or an emulsion polymerization method can be employed. Among them, the forced emulsification is preferable.

It is desired that the amount of the oil-soluble dye in the polymer emulsion is 5 to 900 parts by weight, preferably 10 to 400 parts by weight, based on 100 parts by weight of the solid matters of the polymer, from the viewpoints of optical density and easiness for incorporation of the dye in the fine polymer particles.

In addition, it is desired that the content of the solid matters contained in the polymer emulsion in the water-based ink is 0.5 to 30% by weight, preferably 1 to 20% by weight, from the viewpoints of jetting stability and optical density.

It is preferable that the average particle diameter of the oil-soluble dye-containing polymer particles contained in the polymer emulsion is 20 to 200 mm, from the viewpoint of dispersing stability.

When using a polymer emulsion in which a polymer being copolymerized with an anionic monomer is employed, it is preferable to add an anionic surfactant or an amphoteric surfactant to the polymer emulsion, in order to maintain the dispersion stability of a water-based ink. On the other hand, when using a polymer emulsion in which a polymer being copolymerized with a cationic monomer is employed, it is preferable to use a cationic surfactant or an amphoteric surfactant, in order to maintain the dispersion stability of the water-based ink.

The water-based ink of the present invention may contain a moisturizing agent as occasion demands.

The moisturizing agent includes, for instance, glycols such as ethylene glycol, propylene glycol, diethylene glycol, triethylene glycol and glycerol; and nitrogen-containing compounds, e.g. amino acids and the like, and urea, ethyleneurea, 2-pyrrolidone, N-methyl-2-pyrrolidone, 1,3-dimethylimidazolidinone, formamide, trimethylglycine, methylglycine and 6-amino-n-caproic acid. Those moisturizing agents can be used alone or in admixture of at least two kinds.

The water-based ink may further contain an additive such as a defoaming agent, a pH adjusting agent, an antiseptic, an ultraviolet ray absorbent, an oxygen absorbing agent, a chelating agent, as occasion demands, within a range which would not hinder the object of the present invention.

EXAMPLES

Example 1

Preparation of Oil-soluble Dye A

A 1-L separable flask was charged with 5 g of a magenta acid dye (C.I. Acid Red 289, commercially available from Chugai Kasei K.K. under the trade name of Chugai Aminol Fast Pink R H/C), and nitrogen gas substitution was sufficiently carried out.

Next 1.3 g of N,N-dimethylformamide and 300 g of chloroform were added to the flask, and the mixture was sufficiently stirred. Thereafter, the flask was soaked in an ice bath, and 2.2 g of thionyl chloride was added dropwise thereto at 3° C. After the termination of dropwise addition, the mixture was aged at room temperature ( 25° C.) for 3 hours, to give a chlorination reaction solution.

Ten grams of N,N-dimethylformamide was added to the resulting chlorination reaction solution. The flask was again soaked in an ice bath, and 7.4 g of dioctylamine was added dropwise thereto at 3° C. to carry out amidation. Thereafter, the mixture was aged at room temperature (about 25° C.) for 3 hours. After aging, the reaction mixture was washed with water three times, and thereafter washed with a 0.01 N aqueous sodium hydroxide three times. After washing, the resulting reaction solution was added dropwise to hexane to allow re-precipitaton, and the precipitated product was filtered and dried. The resulting dried product was washed with hexane three times and dried again, to give an oil-soluble dye A represented by the formula:

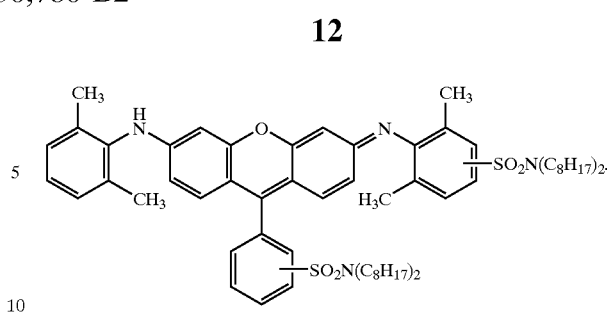

The yield was 74%.

Example 2

Preparation of Oil-soluble Dye B

A 1-L separable flask was charged with 15 g of a yellow acid dye (C I. Acid Yellow 23, commercially available from Orient Chemical Co., Ltd. under the trade name of Water Yellow 1), and nitrogen gas substitution was sufficiently carried out.

Next, 4.64 g of N,N-dimethylformamide and 300 g of chloroform were added to the flask, and the mixture was sufficiently stirred. Thereafter, the flask was soaked in an ice bath, and 7.55 g of thionyl chloride was added dropwise thereto at 3° C. After the termination of dropwise addition, the mixture was aged at room temperature (about 25° C.) for 3 hours, to give a chlorination reaction solution.

Ten grams of N,N-dimethylformamide was added to the resulting chlorination reaction solution. The flak was again soaked in an ice bath, and 20.49 g of dibutylamine was added dropwise thereto at 3° C. to carry out amidation. Thereafter, the mixture was aged at room temperature (about 25° C) for 3 hours. After aging, the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and tried again, to give an oil-soluble dye B represented by the formula:

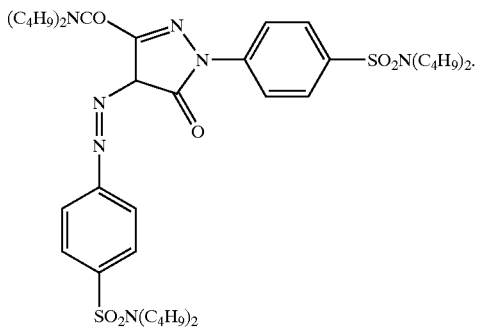

The yield was 81%.

Example 3

Preparation of Oil-soluble Dye C

A 1-L separable flask was charged with 15 g of a yellow acid dye (C.I. Acid Yellow 17, commercially available from NIPPON KAYAKU CO., LTD. under the trade name of Kayacyl Yellow GG), and nitrogen gas substitution was sufficiently carried out.

Next, 2.65 g of N,N-dimethylformamide and 300 g of chloroform were added to the flask, and the mixture was sufficiently stirred. Thereafter, the flask was soaked in an ice bath, and 4.32 g of thionyl chloride was added dropwise thereto at 3° C.

After the termination of dropwise addition, the mixture was aged at room temperature (about 25° C.) for 3 hours, and the reaction solution was added dropwise to ice water. The mixture was washed with water three times, and thereafter washed with a 0.01 N aqueous sodium hydroxide three times. After washing, the flask was again charged with the resulting reaction solution, and soaked in an ice bath, and 16.82 g of dihexylamine was added dropwise thereto at 3° C. After the termination of dropwise addition, the mixture was aged at room temperature (about 25° C.) for 3 hours, and the mixture was washed with water three times. Thereafter, the mixture was washed with a 0.01 N aqueous sodium hydroxide three times. After washing the resulting reaction solution was added dropwise to hexane to allow re-precipitation, and the precipitated product was filtered and dried. The resulting dried product was washed with hexane three times and dried again, to give an oil-soluble dye C represented by the formula:

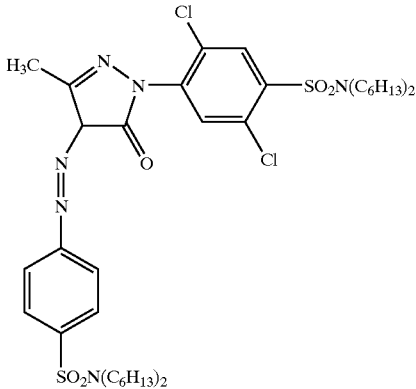

The yield was 70.89%.

Example 4

Preparation of Oil-soluble Dye D

A 1-L separable flask was charged with 10 g of a yellow direct dye (C.I. Direct Yellow 86, commercially available from Daiwa Kasei K.K under the trade name of Daiwa IJ Yellow 214H), ad nitrogen gas substitution was sufficiently carried out.

Next, 0.26 g of N,N-dimethylformamide and 300 g of chloroform were added to the flask, and the mixture was sufficiently stirred. Thereafter, the flask was soaked in an ice bath, and 5.06 g of thionyl chloride was added dropwise thereto at 3° C.

After the termination of dropwise addition, the mixture was aged at room temperature (about 25° C.) for 3 hours. After aging the reaction solution was added dropwise to an ice bath, and washed with water three times. After washing, the flask was again charged with the resulting reaction solution and soaked in an ice bath, and 7.77 g of diethylamine was added dropwise thereto at 3° C. After the termination of dropwise addition, the mixture was aged at room temperature (about 25° C. for 3 hours. After aging, the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and dried again, to give an oil-soluble dye D. The yield was 75.98%.

Example 5

Preparation of Oil-soluble Dye E

A 1-L separable flask was charged with 5 g of a yellow direct dye (C.I. Direct Yellow 132, commercially available from Daiwa Kasei K.K. under the trade name of Daiwa IJ Yellow 306H), and nitrogen gas substitution was sufficiently carried out.

Next 0.20 g of N,N-dimethylformamide and 300 g of chloroform were added to the flask, and the mixture was sufficiently stirred. Thereafter, the flask was soaked in an ice bath, and 4.50 g of thionyl chloride was added dropwise thereto at 3° C.

After the termination of dropwise addition, the mixture was aged at room temperature (about 25° C.) for 3 hours. After aging, the reaction solution was added dropwise to an ice bath, and washed with water free times. After washing, the flask was again charged with the resulting reaction solution and soaked in an ice bath, and 11.76 g of diethylamine was added dropwise thereto at 3° C. After the termination of dropwise addition, the mixture was aged at room temperature (about 25° C.) for 3 hors. After aging, the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and dried again, to give an oil-soluble dye E represented by the formula:

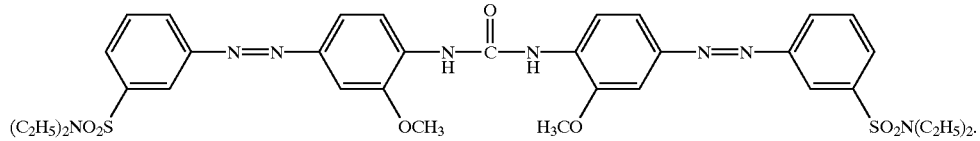

The yield was 82.32%.

Comparative Examples 1 to 13

As a dye, there was used Dye a [commercially available from Chugai Kasei K.K. under the trade name of Chugai Aminol Fast Pink R H/C], Dye b [commercially available from Orient Chemical Co., Ltd. under the trade name of Water Yellow 1], Dye c [commercially available from NIPPON KAYAKU CO., LTD. under the trade name of Kayacyl Yellow GG], Dye d [commercially available from Daiwa Kasei K.K. under the trade name of Daiwa IJ Yellow 214H], Dye e [commercially available from Daiwa Kasei K.K. under the trade name of Daiwa IJ Yellow 306H], Dye f [one prepared by neutralizing the above-mentioned Chugai Aminol Fast Pink R H/C with dioctylamine], Dye g [one prepared by neutralizing the above-mentioned Water Yellow 1 with dibutylamine], Dye h [one prepared by neutralizing the above-mentioned Kayacyl Yellow GG with dihexylamine], Dye i [one prepared by neutralizing the above-mentioned Daiwa IJ Yellow 214H with diethylamine], Dye j [one prepared by neutralizing the above-mentioned Daiwa IJ Yellow 306H with diethylamine], Dye k [commercially available from BASF under the trade name of Neozapon Magenta 525], Dye I [C.I. Solvent Red 49, commercially available from Orient Chemical Co., Ltd. under the trade name of Oil Pink 312], or Dye m [commercially available from BASF under the trade name of Neopen Yellow 075].

The physical properties of the dye obtained in each of Examples and Comparative Examples were evaluated by the following methods. The results are shown in Table 1.

A. Water Resistance, Alkali Resistance and Acid Resistance

In 10 ml of tetrahydrofuran was dissolved 0.1 g of a dye. A paper sheet for plain paper copy [commercially available from XEROX CO., LTD. under the trade name of XEROX 4024] was immersed in the solution for 10 minutes, and thereafter taken out therefrom to be air-dried at 25° C. for 24 hours. After drying, the paper was immersed in water (water resistance), a 1 N-aqueous sodium hydroxide (alkali resistance), or a 1 N-aqueous hydrochloric acid (acid resistance) for 10 minutes to examine whether or not the dye is dissolved in each solvent. The evaluation was made on the basis of the following evaluation criteria:

(Evaluation Criteria)
○: Dye not being dissolved
x: Dye being dissolved

B. Light Fastness

A dye was dissolved in tetrahydrofuran in a concentration of 1.0% by weight. A paper sheet of plain paper copy [commercially available from XEROX CO., LTD. under the trade name of XEROX 4024] was immersed in the solution for 10 minutes, and thereafter taken out therefrom to be air-dried at 25° C. for 24 hours. After drying, the paper was irradiated at 10000 kJ/m$^2$ with a xenon fade meter [commercially available from Suga Shikenki K.K. under the trade name of Low-temperature cycle-xenon-long life-fade meter], and thereafter the examination of whether or not there is any fading in the dye was made. The evaluation was made on the basis of the following evaluation criteria:

(Evaluation Criteria)
○: No fading was generated.
x: Fading was generated.

C. Solvent Solubility

Twenty parts by weight of a dye was added to 100 parts by weight of a solvent shown in Table 1, and whether or not the dye is dissolved in the solvent at 20° C. was observed. The evaluation was made on the basis of the following evaluation criteria:

(Evaluation Criteria)
○: Dye being dissolved
x: Dye not being dissolved

TABLE 1

| Kinds of Oil-Soluble Dye | Physical Properties of Dye | | | | | | | |
|---|---|---|---|---|---|---|---|---|
| | Water Resistance | Alkali Resistance | Acid Resistance | Light Fastness | Solvent Solubility | | | |
| | | | | | Toluene | 2-Butanone | Ethanol | Tetrahydrofuran |

| Ex. No. | | | | | | | | | |
|---|---|---|---|---|---|---|---|---|---|
| 1 | A | ○ | ○ | ○ | ○ | ○ | ○ | ○ | ○ |
| 2 | B | ○ | ○ | ○ | ○ | ○ | ○ | ○ | ○ |
| 3 | C | ○ | ○ | ○ | ○ | ○ | ○ | ○ | ○ |
| 4 | D | ○ | ○ | ○ | ○ | ○ | ○ | ○ | ○ |
| 5 | E | ○ | ○ | ○ | ○ | ○ | ○ | ○ | ○ |
| Comp. Ex. No. | | | | | | | | | |
| 1 | a | X | X | X | ○ | X | X | X | X |
| 2 | b | X | X | X | ○ | X | X | X | X |
| 3 | c | X | X | X | ○ | X | X | X | X |
| 4 | d | X | X | X | ○ | X | X | X | X |
| 5 | e | X | X | X | ○ | X | X | X | X |
| 6 | f | ○ | X | X | ○ | ○ | ○ | ○ | ○ |
| 7 | g | ○ | X | X | ○ | ○ | ○ | ○ | ○ |
| 8 | h | ○ | X | X | ○ | ○ | ○ | ○ | ○ |
| 9 | i | ○ | X | X | ○ | ○ | ○ | ○ | ○ |
| 10 | j | ○ | X | X | ○ | ○ | ○ | ○ | ○ |
| 11 | k | ○ | ○ | ○ | X | X | X | X | X |
| 12 | l | ○ | ○ | ○ | X | ○ | ○ | ○ | ○ |
| 13 | m | ○ | ○ | ○ | ○ | X | X | X | X |

It can be seen from the results shown in Table 1 that all of the oil-soluble dyes obtained in Examples 1 to 5 are simultaneously excellent in water resistance, alkali resistance, acid resistance, light fastness and solvent solubility.

Comparative Example 14

The chlorination reaction solution obtained in the same manner as in Example 1 was added dropwise to ice water to be washed with water. As a result, the reaction product was gelated as a whole, so that its amidation could not be carried out.

Comparative Example 15

The chlorination reaction solution obtained in the same manner as in Example 2 was added dropwise to ice water to be washed with water. As a result, the whole solution was dissolved in water, so that no dye could be obtained.

Preparation Example 1

Preparation of Oil-soluble Dye IA

A 1-L separable flask was charged with 5 g of a water-soluble dye a [magenta acid dye: C.I. Acid Red 289, commercially available from Chugai Kasei K.K. under the trade name of Chugai Aminol Fast Pink R H/C], and nitrogen gas substitution was sufficiently carried out in a hot bath at 60° C.

Next, 1.3 g of N,N-dimethylformamide and 300 g of 1,3-dimethyl-2-imidazolidinone were added to the flask and the mixture was sufficiently stirred. Thereafter, the flask was soaked in an ice bath, and 2.2 g of thionyl chloride was added dropwise hereto at 3° C. After the termination of dropwise addition, the mixture was aged at room temperature (about 25° C.) for 3 hours, to give a chlorination reaction solution.

Ten grams of triethylamine was added to the resulting chlorination reaction solution, and thereafter, the mixture was aged at room temperature (about 25° C.) for 1 hour. After aging, the flask was soaked again in the ice bah, and 7.4 g of dioctylamine was added dropwise thereto at 3° C. to carry out amidation. Thereafter, the mixture was aged at room temperature (about 25° C.) for 3 hours. After aging, the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and dried again, to give an oil-soluble dye IA represented by the formula:

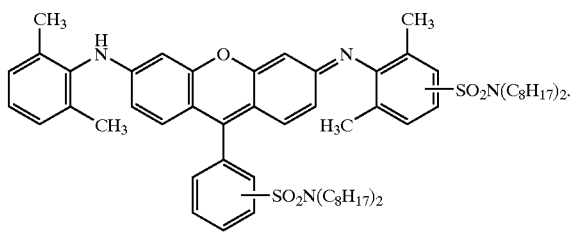

The yield was 74.5%.

Preparation Example 2

Preparation of Oil-soluble Dye IB

A 1-L separable flask was charged with 5 g of a water-soluble dye b [Yellow acid dye: C.I. Acid Yellow 23, commercially available from Orient Chemical Co., Ltd. under the trade name of Water Yellow 1], and nitrogen gas sufficiently was sufficiently carried out.

Next 4.64 g of N,N-dimethylformamide and 300 g of chloroform were added to the flask, and the mixture was sufficiently stirred. Thereafter, the flask was soaked in an ice bath, and 7.55 g of thionyl chloride was added dropwise thereto at 3° C. After the termination of dropwise addition, the mixture was aged at room temperature (about 25° C.) for 3 hours, to give a chlorination reaction solution.

Ten grams of triethylamine was added to the resulting chlorination reaction solution, and thereafter, the mixture was aged at room temperature (about 25° C.) for 1 hour. After aging, the flask was soaked again in the ice bath, and 20.49 g of dibutylamine was added dropwise thereto at 3° C. to carry out amidation. Thereafter, the mixture was aged at room temperature (about 25° C.) for 3 hours. After aging, the reaction mixture was washed with water three times, and thereafter washed with a 0.01 N aqueous sodium hydroxide three times. After washing, the mixture was added dropwise to hexane to allow re-precipitation, and the precipitated product was filtered and dried. The resulting dried product was washed with hexane three times and dried again, to give an oil-soluble dye B represented by the formula:

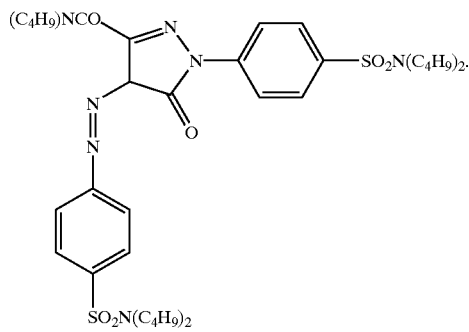

The yield was 81.2%.

Preparation Example 3

Preparation of Oil-soluble Dye IC

A 1-L separable flask was charged with 15 g of a water-soluble dye c [yellow acid dye: C.I. Acid Yellow 17, commercially available from NIPPON KAYAKU CO., LTD. under the trade name of Kayacyl Yellow GG], and nitrogen gas substitution was sufficiently carried out.

Next, 2.65 g of N,N-dimethylformamide and 300 g of chloroform were added to the flask, and the mixture was sufficiently stirred. Thereafter, the flask was soaked in an ice bath, and 4.32 g of thionyl chloride was added dropwise thereto at 3° C.

After the termination of dropwise addition, the mixture was aged at room temperature (about 25° C.) for 3 hours. Thereafter, the reaction mixture was added dropwise to ice water, and the mixture was washed with water three times. The flask was again charged with the resulting reaction solution and soaked in the ice bath, and thereafter 16.82 g of dihexylamine was added dropwise thereto at 3° C. After the termination of dropwise addition, the mixture was aged at room temperature (about 25° C.) for 3 hours. After aging the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting again, to give an oil-soluble dye ID represented by the formula:

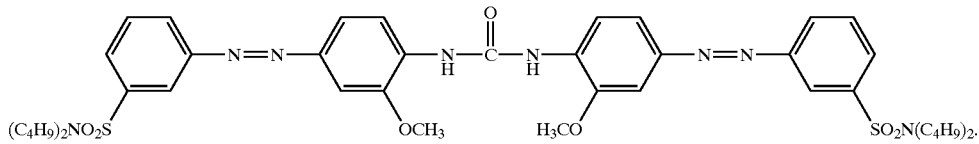

dried product was washed with hexane three times and dried again, to give an oil-soluble dye IC represented by the formula:

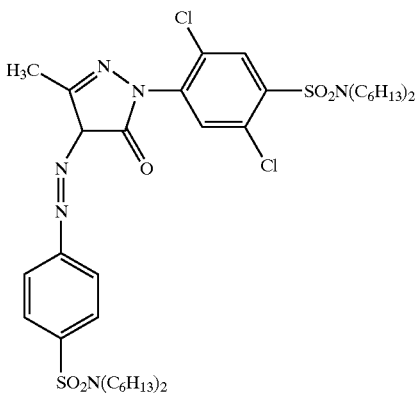

The yield was 70.9%.

Preparation Example 4

Preparation of Oil-soluble Dye ID

A 1-L separable flask was charged with 5 g of a water-soluble dye d (yellow direct dye: C.I. Direct Yellow 132, commercially available from Daiwa Kasei K.K. umder the trade name of Daiwa IJ Yellow 306H), and nitrogen gas substitution was sufficiently carried out.

Next, 0.2 g of N,N-dimethylformamide and 300 g of 1,3-dimethyl-2-imidazolidinone were added to the flask, and the mixture was sufficiently stirred. Thereafter, the flask was soaked in an ice bath, and 4.2 g of thionyl chloride was added dropwise thereto at 3° C. After the termination of dropwise addition, the mixture was aged at room temperature (about 25° C.) for 3 hours, and the mixture was washed with water three times.

The flask was again charged with the resulting reaction solution and soaked in an ice bath, and 7.5 g of dibutylamine was added dropwise thereto at 3° C. After the termination of dropwise addition, the mixture was aged at room temperature (about 25° C.) for 3 hours. After aging, the reaction mixture was washed with water three times, and thereafter washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and dried The yield was 92.5%.

Example 5

Preparation of Oil-soluble Dye IE

A 1-L separable flask was charged with 5 g of a water-soluble dye e [yellow direct dye: C.I. Direct Yellow 86, commercially available from Daiwa Kasei K.K. under the trade name of Daiwa IJ Yellow 214H], and nitrogen gas substitution was sufficiently carried out.

Next, 1.87 g of N,N-dimethylformamide and 300 g of 2-pyrrolidone were added to the flask, and the mixture was sufficiently stirred. Thereafter, the flask was soaked in an ice bath, and 3.05 g of thionyl chloride was added dropwise thereto at 3° C.

After the termination of dropwise addition, the mixture was aged at room temperature (about 25° C.) for 3 hours. Thereafter, the reaction mixture was added dropwise to ice water and washed with water three times. The flask was charged again with the reaction solution and soaked in ice bath, and thereafter 20.67 g of diethylamine was added dropwise at 3° C. to the flask. After the termination of dropwise addition, the reaction mixture was aged at room temperature (about 25° C.) for 3 hours. Thereafter, the mixture was washed with water three times and then washed with a 0.01 N aqueous sodium hydroxide three times. After washing, the resulting reaction solution was added dropwise to hexane to allow re-precipitation, and the precipitated product was filtered and dried. The resulting dried product was washed with hexane three times and dried again, to give an oil-soluble dye IE. The yield was 86.3%.

Reference Examples 1 to 7

As a dye, there was used each of the water-soluble dyes a to e used in Preparation Examples 1 to 5, an oil-soluble dye f [C.I. Solvent Red 49, commercially available from Orient Chemical Co., Ltd. under the trade name of Oil Pink 312] or an oil-soluble dye g [commercially available from BASF under the trade name of Neopen Magenta 525]. The oil-soluble dyes f and g did not have a sulfonate group or a carboxyl group in its molecule.

Examples 6 to 10 and Comparative Examples 16 to 22

(1) Preparation of Vinyl Polymer

A dropping funnel and a reflux condenser were attached to a 500-ml separable flask, and nitrogen gas substitution was sufficiently carried out. Thereafter, the flask was charged with 30 g of methyl methacrylate, 2 g of acrylic acid, 8 g of methoxypolyethylene glycol methacrylate (commercially available from Shin-Nakamra Chemical Co., Ltd. under the trade name of NK ESTER M-40G), 0.4 g of 2-mercaptoethanol and 10 g of 2-butanone, and the temperature was raised to 60° C. with reflux.

A dropping funnel was charged with 120 g of methyl methacrylate, 8 g of acrylic acid, 32 g of methoxypolyethylene glycol methacrylate (commercially available from Shin-Nakamura Chemical Co., Ltd. under the trade name of NK ESTER M40G), 1.6 g of 2-mercaptoethanol, 1.6 g of 2,2-azobis(2,4-dimethylvaleronitrile) and 40 g of 2-butanone, and the mixture in the dropping funnel was added dropwise to the flask over a period of 3 hours.

After dropwise addition, the mixture was aged for 2 hours, and 0.4 g of 2,2-azobis(2,4-dimethylvaleronitrile) was added thereto. The mixture was further aged for 2 hours, to give a vinyl polymer solution. A part of its solution was dried at 105° C. under reduced pressure for 2 hours, and the vinyl polymer was isolated by removing the solvent. Its weight-average molecular weight was determined by gel permeation chromatography using polystyrene as a standard substance and tetrahydrofuran as a solvent. As a result, the weight-average molecular weight was 6500.

(2) Preparation of Coloring Material-containing Emulsion

In 10 g of toluene was dissolved 0.6 g of each dye obtained in Preparation Examples 1 to 5 or Reference Example 6 or 7, and 1.4 g of the vinyl polymer solution obtained in the above item (1) was added to the resulting mixed solution, and the mixture was sufficiently stirred to dissolve the dye.

Next, 5.21 g of a 1 N aqueous potassium hydroxide and 50 g of purified water were added to the resulting solution, and the mixture was further sufficiently stirred. After stirring, the mixture was emulsified with an ultrasonic homogenizer at 400 µA for 20 minutes. Thereafter, toluene was removed with heating under reduced pressure, and the resulting mixture was filtered with a 0.8 µm filter, to give a coloring material-containing emulsion in which the dye was contained in the vinyl polymer.

(3) Preparation of Ink

There were mixed together 8 parts by weight of a coloring material-containing emulsion obtained in the above item (2) or a 30% aqueous solution of a dye obtained in any one of Reference Examples 1 to 5, 10 parts by weight of trimethylglycine, 5 parts by weight of urea, 1 part by weight of sodium 2-ethylhexylsulfosuccinate and 76 parts by weight of purified water, to give an ink.

(4) Determination of Physical Properties of Ink

A. Storage Stability of Ink

A 100 mL bottle made of a fluorocarbon resin was charged with an ink, and the bottle was stored in the air at 60° C. for 3 months. As the physical properties, particle sizes before and after storage (determined by a particle size distribution analyzer commercially available from OtsuKa Denshi K.K. under the trade name of ELS-8000), viscosity (determined at 25° C. by a viscometer commercially available from Toki Sangyo K.K. under the trade name of VISCOMETER ELS-80L) and surface tension (determined at 25° C. by a surface tension meter commercially available from Kyowa Kaimen Kagaku K.K. under the trade name of AUTOMATIC Surface Tensiometer CBVP-Z) were examined. The retention ratio in each physical property was obtained in accordance with the following equation:

$$[\text{Retention Ratio}] = \frac{[\text{Physical Properties After Storage}]}{[\text{Physical Properties Before Storage}]} \times 100(\%)$$

B. Physical Properties of Printed Paper

An inkjet printer cartridge (commercially available from CANON INC. under the trade name of BCI-21e) was charged with an ink, and the inkjet printer cartridge was loaded on a bubble jet printer (commercially available from CANON INC. under the model number of BJC430J). Printing was carried out on plain paper (commercially available from CANON INC. under the trade name of The Plain Paper for Inkjet Printing PB Paper) and on high-resolution coated paper (commercially available from CANON INC. under the trade name of (The High Resolution Coated Paper HR-101), and sufficiently dried. Thereafter, the following physical properties of the printed paper were evaluated. The results are shown in Table 2.

① Color Tone

The color tone (L*a*b*) of the printed matter on PB paper (commercially available from CANON INC.) evaluated with a colorimeter (commercially available from Nippon Denshoku Kogyo Kabushiki Kaisha under the trade name of SE2000).

② Water Resistance

The printed matter on a paper sheet for plain paper copy was soaked in purified water at 25° C. for 10 minutes, and thereafter water was sufficiently removed to be air-dried. The optical density (hereinafter referred to as OD) of the same site before and after soaking was determined by using an optical density analyzer [commercially available from Macbeth Process Measurements Co., umder the trade name of reflection densitometer RD-914]. Its OD residual ratio was obtained in accordance with the following equation:

$$[\text{OD Residual Ratio}] = \frac{[\text{OD After Immersion}]}{[\text{OD Before Immersion}]} \times 100$$

③ Light Fastness

A printed matter of the PB Paper (commercially available from CANON INC.) was irradiated at 10000 kJ/m$^2$ with a xenon fade meter (commercially available from Suga Shikenki K.K. under the trade name of Low-temperature cycle-xenon-long life-fade meter). The optical density (OD) of the same site before and after irradiation was determined by using the same optical density analyzer as above. Its OD residual ratio was obtained in accordance with the following equation:

$$[\text{OD Residual Ratio}] = \frac{[\text{OD After Irradiation}]}{[\text{OD Before Irradiation}]} \times 100$$

④ Ozone Resistance

A printed matter on a paper sheet for plain paper copy was exposed in a gas stream having an ozone concentration of 3 ppm for 2 hours, and the color tone (L*a*b*) before and after exposure was determined by using a colorinmeter [commercially available from Nippon Denshoku Kogyo Kabushiki Kaisha under the trade name of SE2000], and indicated by ΔE.

C. Clogging on Printer Head

After printing, the printer head was taken out from the printer, and the printer head was allowed to stand in the surroundings of normal temperature under normal pressure for 24 hours. Thereafter, the printer head was again loaded on the printer, and the evaluation was made in accordance with the following criteria.

(Evaluation Criteria)
○: Capable of jetting from all of the nozzles
X: Incapable of jetting from not less than one of nozzles

TABLE 2

Physical Properties of Printed Matter

| Ex. No. | Kind of Dye | Color Tone L* | a* | b* | Water Resistance [OD Residual Ratio (%)] | Light Fastness [OD Residual Ratio (%)] | Ozone Resistance (ΔE) | Clogging of Printer Head | Retention Ratio of Physical Properties After Storage (%) Particle Size | Viscosity | Surface Tension |
|---|---|---|---|---|---|---|---|---|---|---|---|
| 6 | Oil-Soluble Dye IA | 58 | 65 | −15 | 100 | 95 | 0 | ○ | 101.6 | 92 | 94.9 |
| 7 | Oil-Soluble Dye IB | 84 | −4 | 84 | 100 | 98 | 0 | ○ | 98.4 | 95 | 97.3 |
| 8 | Oil-Soluble Dye IC | 85 | −19 | 70 | 100 | 100 | 0 | ○ | 99.4 | 100 | 98.5 |
| 9 | Oil-Soluble Dye ID | 85 | −3 | 65 | 100 | 94 | 0 | ○ | 101.3 | 96 | 97.0 |
| 10 | Oil-Soluble Dye IE | 85 | 4 | 70 | 100 | 100 | 0 | ○ | 99.1 | 101 | 98.4 |
| Comp. Ex. No. | | | | | | | | | | | |
| 16 | Water-Soluble Dye a | 59 | 69 | −11 | 84 | 73 | 4 | ○ | — | 105 | 99.7 |
| 17 | Water-Soluble Dye b | 86 | −0.4 | 89 | 40 | 87 | 5 | ○ | — | 96 | 96.6 |
| 18 | Water-Soluble Dye c | 88 | −15 | 74 | 42 | 93 | 3 | ○ | — | 105 | 98.6 |
| 19 | Water-Soluble Dye d | 87 | −4 | 73 | 35 | 82 | 0 | ○ | — | 105 | 101.2 |
| 20 | Water-Soluble Dye e | 89 | 5 | 76 | 56 | 86 | 10 | ○ | — | 92 | 93.9 |
| 21 | Water-Soluble Dye f | 50 | 65 | −22 | 100 | 45 | 8 | ○ | 93 | 91 | 97.9 |
| 22 | Water-Soluble Dye g | 48 | 65 | −16 | 100 | 42 | 10 | X | 319 | 257 | 99.1 |

It can be seen from the results shown in Table 2 that the inks obtained in Examples 6 to 10 are excellent in storage stability, and that they are less likely to cause clogging on print heads.

In addition, it can be seen that the printed matters printed with the inks obtained in Examples 6 to 10 have vivid color tone. Moreover, they are excellent in water resistance, light fastness and ozone resistance.

As explained above, the oil-soluble dye of the present invention is excellent in all of water resistance, alkali resistance, acid resistance, light fastness and solvent solubility.

In addition, the water-based ink of the present invention exhibits various excellent effects such that it is excellent in storage stability, imparts vivid color tone, excellent water resistance, excellent light fastness and excellent ozone resistance to the printed matters, and is less likely to cause clogging on printer head when used as a water-based ink for inkjet recording.

Industrial Applicability

The oil-soluble dye of the present invention can be suitably and favorably used for inks for inkjet recording, inks for ball-point pens, inks for markers, toners, paints such as lacquers, inks for felt pens, and the like. In addition, the water-based ink of the present invention can be suitably used as a water-based ink for inkjet recording and the like. cl Equivalent Those skilled in the art will recognize, or be able to ascertain using simple routine experimentation, many equivalents to the specific embodiments of the invention described in the present specification. Such equivalents are intended to be encompassed in the scope of the present invention as recited in the following claims.

What is claimed is:

1. An oil-soluble dye prepared by subjecting a water-soluble dye having at least one group selected from the group consisting of sulfonate group and carboxyl group in its molecule to amidation, wherein the water-soluble dye is C.I. Acid Red 289, C.I. Acid Yellow 17, C.I. Direct Yellow 86, or C.I. Direct Yellow 132.

2. The oil-soluble dye according to claim 1, wherein the amidation is carried out with a secondary amine.

3. The oil-soluble dye according to claim 1, wherein the amidation is carried out with a basic dye having an amino group in its molecule.

4. A water-based ink comprising the oil-soluble dye of claim 1.

5. An oil-soluble dye prepared by subjecting a water-soluble dye having at least one group selected from the group consisting of sulfonate and carboxyl group in its molecule to amidation with a basic dye having an amino group in its molecule.

6. The oil-soluble dye according to claim 5, wherein the amidation is carried out with a secondary amine.

7. A water-based ink comprising the oil-soluble dye of claim 5 or 6.

8. A water-based ink comprising an oil-soluble dye prepared by subjecting a water-soluble dye having at least one group selected from the group consisting of sulfonate group and carboxyl group in its molecule to amidation.

9. The water-based ink according to claim 8, wherein the amidation is carried out with a secondary amine.

* * * * *